(12) United States Patent
Kim et al.

(10) Patent No.: US 10,473,181 B2
(45) Date of Patent: Nov. 12, 2019

(54) HYDRAULIC MOUNT FOR VEHICLE

(71) Applicants: Hyundai Motor Company, Seoul (KR); Kia Motors Corporation, Seoul (KR); Pyung Hwa Industrial, Daegu (KR)

(72) Inventors: Hyo Seok Kim, Gyeonggi-do (KR); Sang Cheon Lee, Gyeonggi-do (KR); Jong Su Park, Daegu (KR)

(73) Assignees: Hyundai Motor Company, Seoul (KR); Kia Motors Corporation, Seoul (KR); Pyung Hwa Industrial, Daegu (KR)

( * ) Notice: Subject to any disclaimer, the term of this patent is extended or adjusted under 35 U.S.C. 154(b) by 0 days.

(21) Appl. No.: 15/829,942

(22) Filed: Dec. 3, 2017

(65) Prior Publication Data
US 2019/0128363 A1    May 2, 2019

(30) Foreign Application Priority Data
Oct. 31, 2017  (KR) .......................... 10-2017-0143165

(51) Int. Cl.
| | |
|---|---|
| *F16F 13/10* | (2006.01) |
| *F16H 57/025* | (2012.01) |
| *B60K 5/12* | (2006.01) |
| *F16H 57/028* | (2012.01) |

(52) U.S. Cl.
CPC .......... *F16F 13/107* (2013.01); *B60K 5/1208* (2013.01); *F16F 13/101* (2013.01); *F16H 57/025* (2013.01); *F16H 57/028* (2013.01); *B60Y 2306/09* (2013.01)

(58) Field of Classification Search
CPC .......... F16F 13/07; F16F 13/101; F16F 13/08; F16F 13/106; F16H 57/025; F16H 57/028; B60K 5/1208
USPC ....................................... 267/140.13
See application file for complete search history.

(56) References Cited

U.S. PATENT DOCUMENTS

| | | | |
|---|---|---|---|
| 7,344,128 B2 * | 3/2008 | Muramatsu | F16F 13/106 267/140.13 |
| 8,651,467 B2 * | 2/2014 | Ishikawa | F16F 13/106 267/140.13 |
| 8,783,668 B2 * | 7/2014 | Ishikawa | F16F 13/106 267/140.11 |
| 8,794,606 B2 * | 8/2014 | Kubo | F16F 13/106 267/140.13 |

(Continued)

*Primary Examiner* — Thomas W Irvin
(74) *Attorney, Agent, or Firm* — Mintz Levin Cohn Ferris Glovsky and Popeo, P.C.; Peter F. Corless

(57) ABSTRACT

A hydraulic mount for a vehicle includes: a core bush coupled to a bolt; a main rubber formed on an outer surface of the core bush; an orifice portion coupled to a lower portion of the main rubber to divide an upper fluid chamber and a lower fluid chamber; and a lower rubber film coupled to a lower portion of the orifice portion. The orifice portion includes an upper nozzle plate formed with a first fluid inlet and outlet port, a lower nozzle plate formed with a fluid path and a second fluid inlet and outlet port, and a cylinder-type membrane vertically arranged between the upper nozzle plate and the lower nozzle plate, and a pattern of crests and valleys is formed along a circumference of the membrane, the pattern of crests and valleys selectively contacting the upper nozzle plate and the lower nozzle plate.

5 Claims, 7 Drawing Sheets

(56) References Cited

U.S. PATENT DOCUMENTS

| | | | | |
|---|---|---|---|---|
| 8,807,545 B2* | 8/2014 | Masuda | ............... | F16F 13/106 |
| | | | | 267/140.13 |
| 8,807,546 B2* | 8/2014 | Daito | ................. | F16F 13/108 |
| | | | | 267/140.13 |
| 8,864,114 B2* | 10/2014 | Masuda | ............... | F16F 13/106 |
| | | | | 267/140.13 |
| 8,876,093 B2* | 11/2014 | Kubo | ................. | F16F 13/106 |
| | | | | 267/140.13 |
| 2007/0090579 A1* | 4/2007 | Noe | ................... | F16F 13/103 |
| | | | | 267/140.13 |
| 2014/0175719 A1* | 6/2014 | Kanaya | ............. | F16F 13/106 |
| | | | | 267/140.13 |
| 2015/0316121 A1* | 11/2015 | Kadowaki | .......... | B60K 5/1208 |
| | | | | 267/140.13 |
| 2015/0330476 A1* | 11/2015 | Satori | ................. | F16F 13/106 |
| | | | | 267/140.13 |
| 2019/0017567 A1* | 1/2019 | Kim | ................... | B60K 5/1225 |
| 2019/0111772 A1* | 4/2019 | Yun | ................... | B60K 5/1208 |

* cited by examiner

--Prior Art--

--Prior Art--

--Prior Art--

✹ : noise occurrence

[FIG. 5]
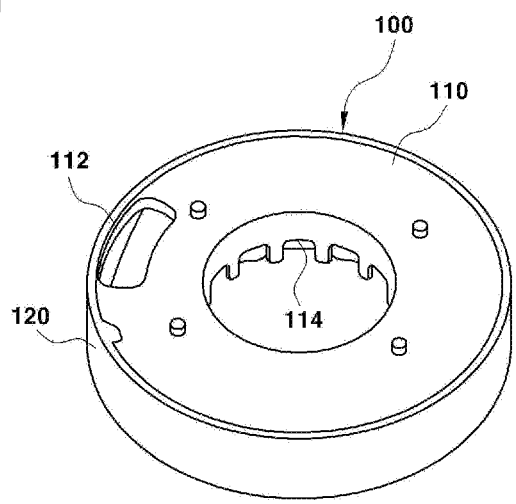
[FIG. 6]
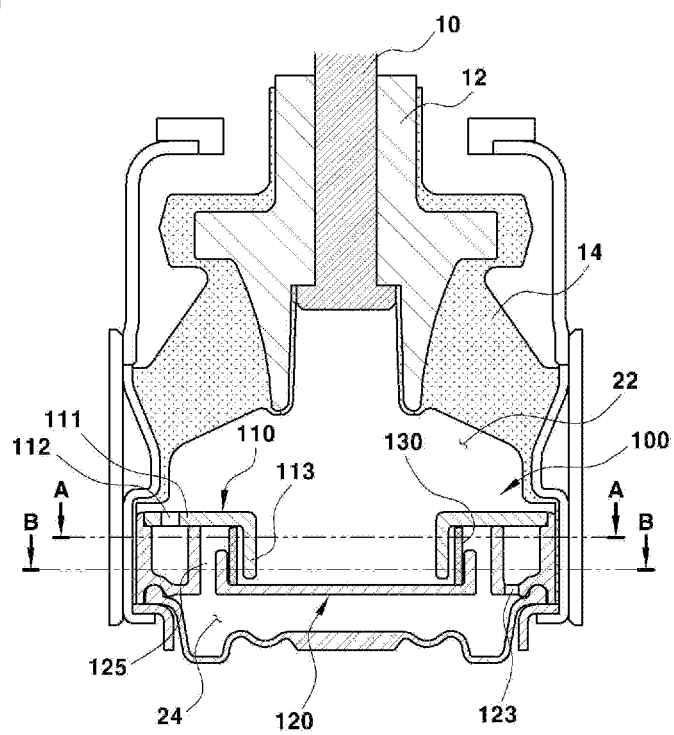

[FIG. 7]
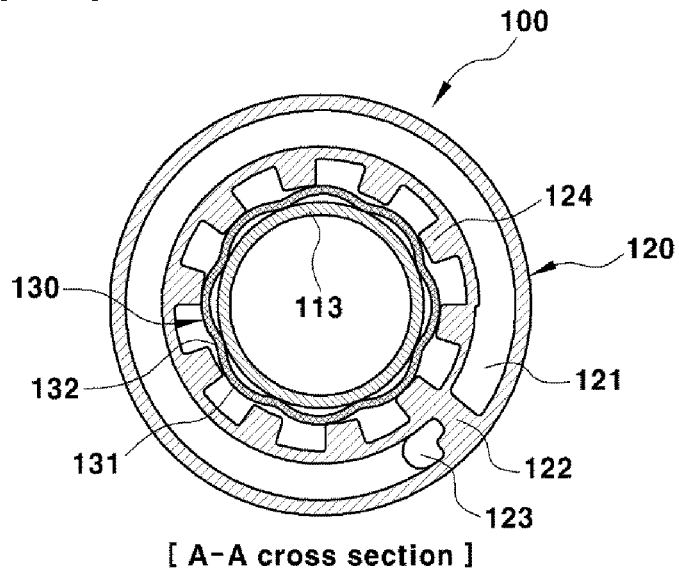
[ A-A cross section ]
[FIG. 8]
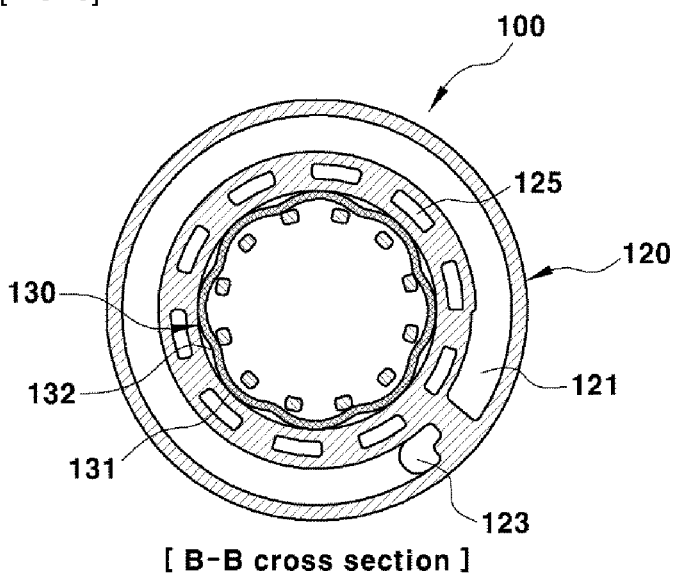
[ B-B cross section ]

[FIG. 9]
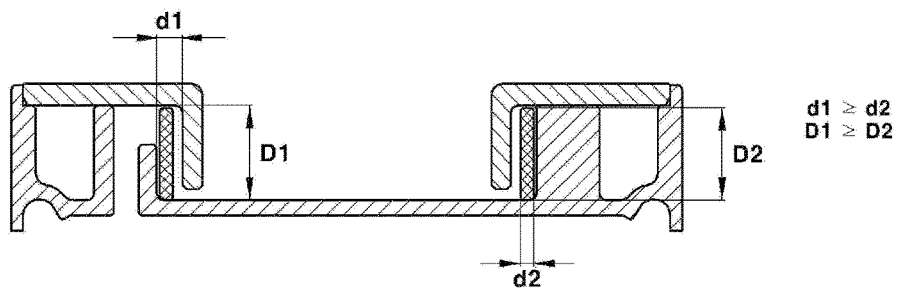
$d1 \geq d2$
$D1 \geq D2$
[FIG. 10]
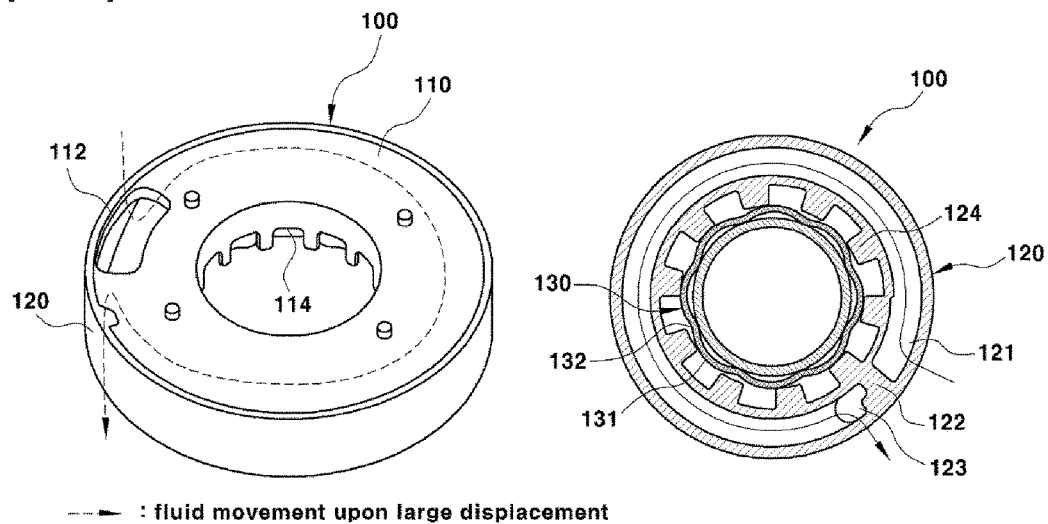
---▶ : fluid movement upon large displacement

[FIG. 11]
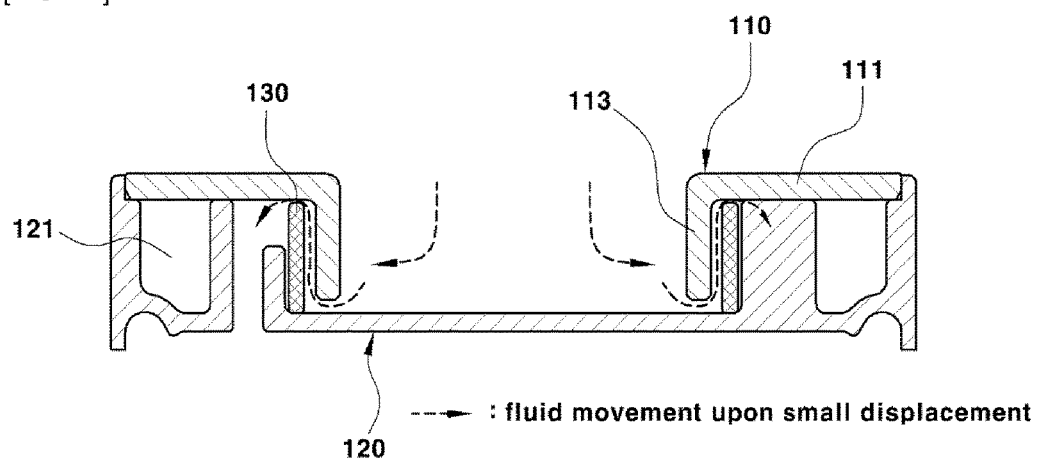
[FIG. 12]
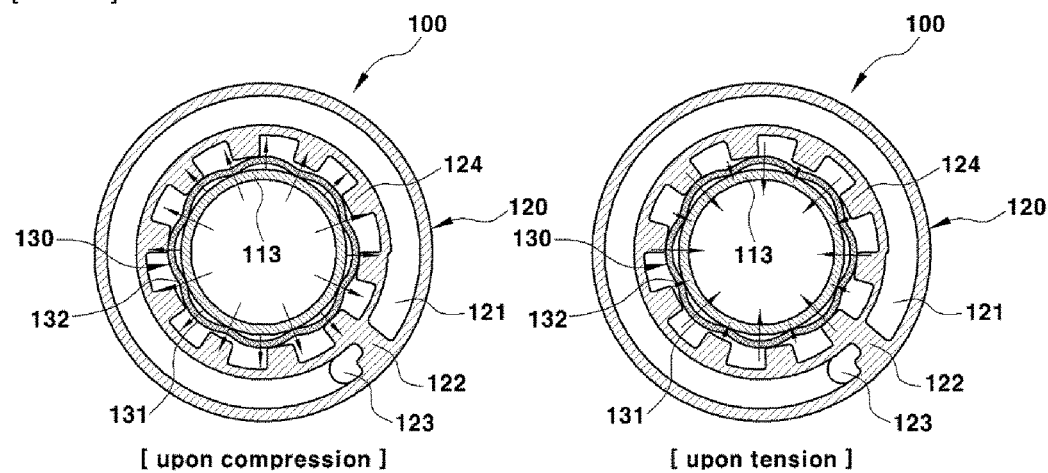
[ upon compression ]   [ upon tension ]

HYDRAULIC MOUNT FOR VEHICLE

CROSS-REFERENCE TO RELATED APPLICATION

This application claims under 35 U.S.C. § 119(a) the benefit of priority to Korean Patent Application No. 10-2017-0143165 filed on Oct. 31, 2017, the entire contents of which are incorporated by reference as if fully set forth herein.

BACKGROUND

(a) Technical Field

The present disclosure relates to hydraulic mounts for a vehicle and, more particularly, to a hydraulic mount for a vehicle capable of distributing and removing a vehicle rattle noise.

(b) Background Art

A vehicle power train generally includes an engine and a transmission. The power train can be mounted in an engine room of a vehicle, by an engine mount, a transmission mount, and the like, to reduce vibration and noise in the vehicle body. For instance, a fluid-sealed-type mount or hydraulic mount is widely used to seal fluid on a lower portion of an insulator (e.g., rubber), and may simultaneously reduce high-frequency range and low-frequency range vibrations.

Herein, a conventional hydraulic mount will be described with reference to the accompanying FIGS. 1 and 2 as follows.

As shown in FIGS. 1 and 2, a reference numeral 10 indicates a bolt coupled with an engine. The bolt 10 is coupled with a core bush 12; and an outer diameter portion of the core bush 12 is formed with a main rubber 14 by the method of a curing adhesion and the like.

Further, a lower portion of the main rubber 14 is positioned with an orifice portion 20 with an upper plate 16 and a lower plate 18 coupled to each other; and a lower portion of the orifice portion 20 is mounted with a lower rubber film 28 connected to a vehicle body using the bolt and the like as a medium.

In this case, the lower plate 18 is formed with a fluid path 18-1 of a concave groove structure on an upper surface portion thereof, and is simultaneously produced as a ring shape with a lower inlet and outlet port formed on a predetermined position of the fluid path 18-1; and the upper plate 16 is produced by a ring-shaped plate body having an upper inlet and outlet port 16-1 to cover the fluid path 18-1 of the lower plate 18 and to be coupled thereto.

A central portion of the orifice portion 20 is mounted with a membrane 26 of a rubber material which divides an upper fluid chamber 22 and a lower fluid chamber 24. Specifically, the membrane 26 is positioned on a central opening portion of the orifice portion 20, is simultaneously received in a step portion 18-3 that an outer diameter portion of the membrane 26 is formed on an inner diameter portion of the lower plate 18, and then becomes the status covered by an inner circumferential end of the upper plate 16.

In this case, a nozzle portion 30, which is a second orifice allowing the fluid movement between the upper fluid chamber 22 and the lower fluid chamber 24, is formed between the outer diameter portion of the membrane 26 and the inner diameter portions of the upper plate 16 and the lower plate 18. Accordingly, when a large displacement vibration (e.g., driving on a bumpy road) is input to the hydraulic mount configured in the manner described above, as illustrated in the right side of the accompanying FIG. 2, the main rubber 14 is compressed and simultaneously, the nozzle portion 30 becomes a closing status by pressing the membrane 26; simultaneously, while the fluid within the upper fluid chamber 22 enters into the fluid path 18-1 of the lower plate 18 through the upper inlet and outlet port 16-1 formed on the upper plate 16 of the orifice portion 20, and then is filled into the lower fluid chamber 24 through the lower inlet and outlet port 18-2 formed on a predetermined position of the fluid path, the high reduction absorbing the large displacement vibration is implemented.

On the other hand, when a small displacement vibration (e.g., driving on a smooth road) is input to the hydraulic mount, as illustrated in the left side of the accompanying FIG. 2, the fluid of the upper fluid chamber 22 may absorb the small displacement vibration while moving toward the lower fluid chamber 24 side through the nozzle portion 30 to thereby obtain an improved effect of Noise, Vibration & Harshness (NVH).

However, as illustrated in the accompanying FIG. 3, when excitation occurs on the hydraulic mount, the membrane 26 is excited while an inner pressure of each fluid chamber varies, and a noise occurs due to hitting of the nozzle portion 30. Meanwhile, the membrane 26 repeatedly experiences tension and compression according to the excitation of the membrane.

The above information disclosed in this Background section is only for enhancement of understanding of the background of the disclosure, and therefore it may contain information that does not form the related art.

SUMMARY OF THE DISCLOSURE

The present disclosure is proposed for solving the above problems. The object of the present disclosure is to provide a hydraulic mount for a vehicle capable of applying a membrane as a cylinder-type structure with repeatedly formed crests and valleys to divide the direction of excitement and move the membrane into a different direction. The hydraulic mount delays the hitting of the nozzle on the membrane to reduce the rattle noise, sequentially contacting the crest and the valley of the membrane with the nozzle plate, and to distribute and/or remove the rattle noise.

According to embodiments of present disclosure, a hydraulic mount includes: a core bush coupled to a bolt; a main rubber formed on an outer surface of the core bush; an orifice portion coupled to a lower portion of the main rubber to divide an upper fluid chamber and a lower fluid chamber; and a lower rubber film coupled to a lower portion of the orifice portion. The orifice portion includes an upper nozzle plate formed with a first fluid inlet and outlet port, a lower nozzle plate formed with a fluid path and a second fluid inlet and outlet port, and a cylinder-type membrane vertically arranged between the upper nozzle plate and the lower nozzle plate, and a pattern of crests and valleys is formed along a circumference of the membrane, the pattern of crests and valleys selectively contacting the upper nozzle plate and the lower nozzle plate.

The upper nozzle plate may include a ring-type horizontal plate, and the first fluid inlet and outlet port and a vertical pipe may be formed on an inner diameter portion of the horizontal plate and supported by the lower nozzle plate.

The vertical pipe may be formed with a plurality of first fluid through-holes at a uniform interval along a circumference thereof.

The fluid path may be formed on an outer circumference of an upper surface of the lower nozzle plate, the second fluid inlet and outlet port may be formed on a predetermined position of the fluid path, and second fluid through-holes may be repeatedly formed along an inner circumference of the upper surface of the lower nozzle plate, the second fluid through-holes vertically penetrated with an upper nozzle plate supporting surface.

A distance between the vertical pipe and an inner diameter portion of the lower nozzle plate may be formed to be larger than a thickness of the membrane.

A distance between the horizontal plate and a bottom plate of the lower nozzle plate may be formed to be larger than a height of the membrane.

Accordingly, the present disclosure provides at least the following effects.

Firstly, it is possible to apply the membrane of the orifice portion, which divides the upper fluid chamber and the lower fluid chamber of the hydraulic mount, as a cylinder-type structure with a pattern of crests and valleys repeatedly formed to make the moving direction of the membrane perpendicular to the direction of excitement which operates on the hydraulic mount, thereby delaying any hitting of the nozzle plate while the membrane moves to reduce a rattle noise due to the hitting.

Secondly, it is possible to make portions of the crest and valley pattern of the membrane sequentially contact according to the movement of the membrane, thereby distributing the collision occurring in the case that the membrane contacts with the nozzle plate to remove the rattle noise.

Other aspects and embodiments of the disclosure are discussed infra.

BRIEF DESCRIPTION OF THE DRAWINGS

The above and other features of the present disclosure will now be described in detail with reference to certain embodiments thereof illustrated the accompanying drawings which are given hereinbelow by way of illustration only, and thus are not limitative of the present disclosure, and wherein:

FIG. 5 is an assembly perspective view illustrating an orifice portion of a hydraulic mount according to embodiments of the present disclosure;

FIG. 6 is a cross-sectional view illustrating the hydraulic mount according to embodiments of the present disclosure;

FIG. 7 is a cross-sectional view taken on line A-A of FIG. 6;

FIG. 8 is a cross-sectional view taken on line B-B of FIG. 6;

FIG. 9 is a cross-sectional view illustrating an assembly gap between the nozzle plate and the membrane constituting the orifice portion of the hydraulic mount according to embodiments of the present disclosure;

FIG. 10 is a view illustrating the fluid flow path in the case that the large displacement vibration is input to the hydraulic mount according to embodiments of the present disclosure;

FIG. 11 is a view illustrating the fluid flow path in the case that the small displacement vibration is input to the hydraulic mount according to embodiments of the present disclosure; and FIG. 12 is a view illustrating the principle that the crest and the valley formed on the membrane of the hydraulic mount according to embodiments of the present disclosure sequentially contact with the nozzle plate to distribute the rattle noise.

Figure 1:
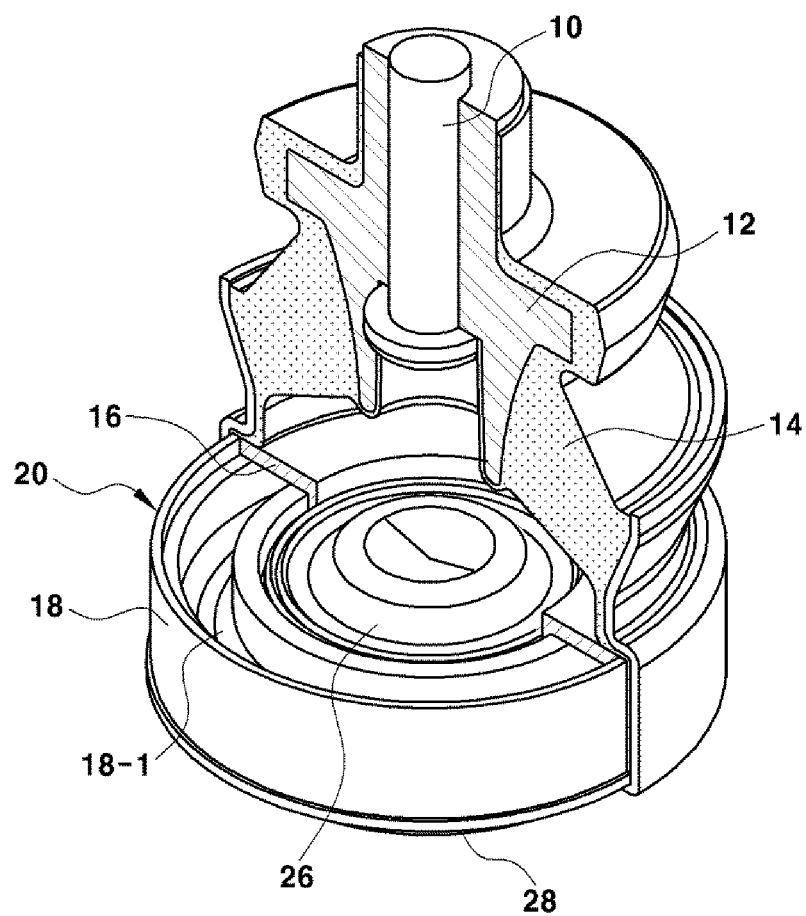
FIGS. 1 and 2 are views illustrating a conventional hydraulic mount.
Figure 2:
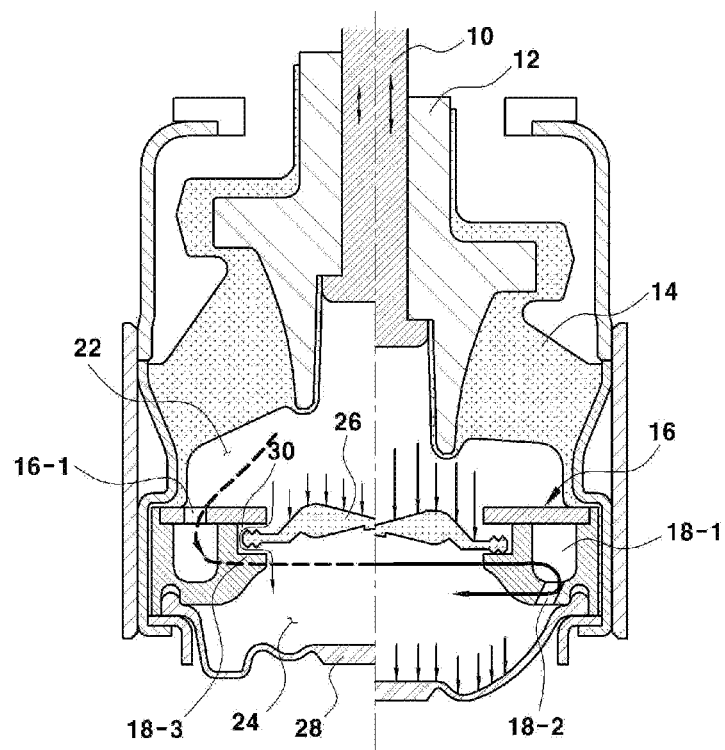
Figure 3:
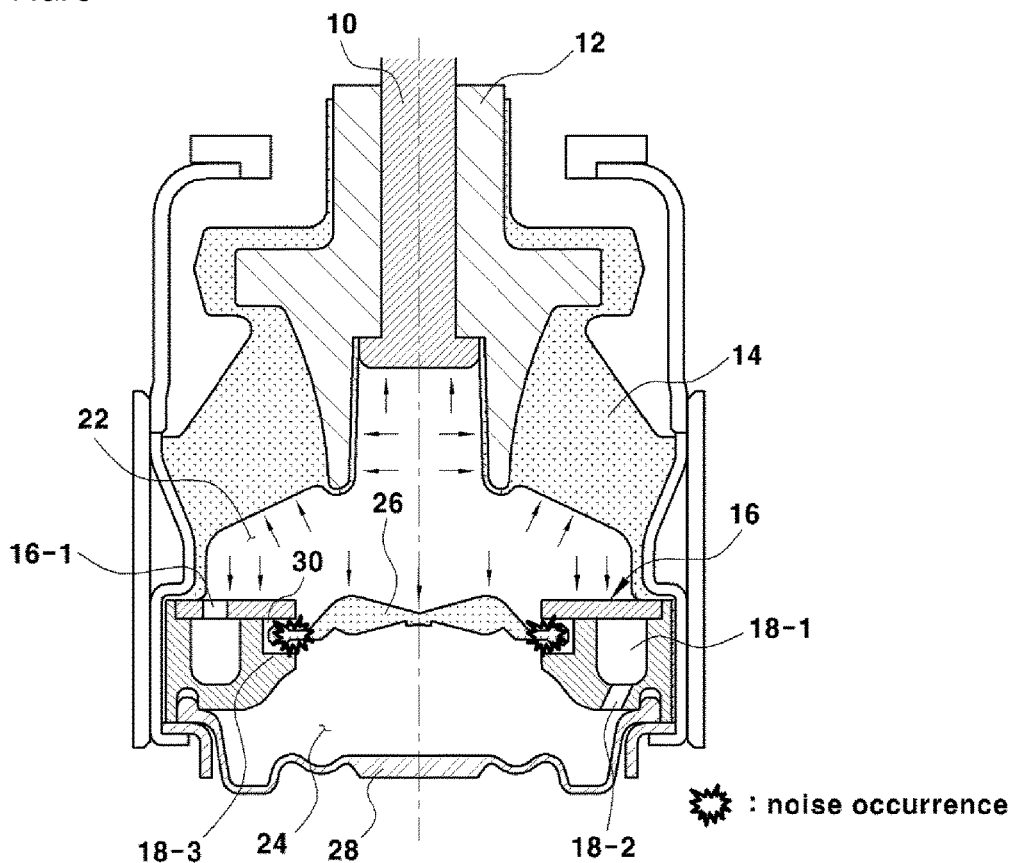
FIG. 3 is a view illustrating problems of the conventional hydraulic mount.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION OF THE EMBODIMENTS

Hereinafter reference will now be made in detail to various embodiments of the present disclosure, examples of which are illustrated in the accompanying drawings and described below. While the disclosure will be described in conjunction with certain embodiments, it will be understood that present description is not intended to limit the disclosure to those embodiments. On the contrary, the present disclosure is intended to cover not only the disclosed embodiments, but also various alternatives, modifications, equivalents and other embodiments, which may be included within the spirit and scope of the disclosure as defined by the appended claims.

As used herein, it will be understood that when a component is referred to as "comprising" any component, it does not exclude other components, but can further comprise the other components unless otherwise specified. The singular forms "a," "an," and "the" are intended to include the plural forms as well, unless the context clearly indicates otherwise. Also, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, embodiments of the present disclosure will be described with reference to the accompanying drawings.

As shown in FIG. 6, a hydraulic mount according to embodiments of the present disclosure includes a core bush 12 coupled with a bolt 10 which is connected with an engine; a main rubber 14 formed on an outer diameter portion of the core bush 12 by the method of a curing adhesion and the like; an orifice portion 100 coupled to a lower portion of the main rubber 14 to divide an upper fluid chamber 22 and a lower fluid chamber 24; and a lower rubber film 28 fastened to the lower portion of the orifice portion 100 to be connected to a vehicle body using the bolt and like as a medium.

Figure 4:
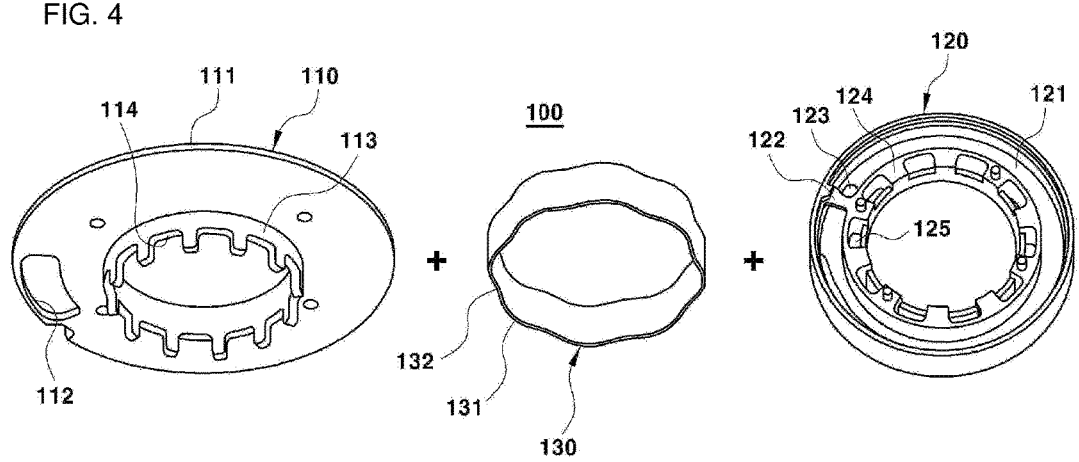
FIG. 4 is an exploded perspective view illustrating an orifice portion of the hydraulic mount according to embodiments of the present disclosure.

Particularly, the orifice portion 100, as illustrated in the FIGS. 4 and 5, is composed of an upper nozzle plate 110 with a first fluid inlet and outlet port 112 formed; a lower nozzle plate 120 with a fluid path 121 and a second fluid inlet and outlet port 123 formed; and a cylinder-type membrane 130 vertically arranged between the upper nozzle plate 110 and the lower nozzle plate 120.

The upper nozzle plate 110 is composed of a ring-type horizontal plate 111 and a vertical pipe 113 downwardly bent on the inner diameter portion of the horizontal plate 111 and supported on a bottom plate of the lower nozzle plate 120.

Further, the first fluid inlet and outlet port 112 is penetrated and formed on a predetermined position of the horizontal plate 111; and the vertical pipe 113 is uniformly formed with a plurality of first fluid through-holes 114 along the circumference thereof.

In this case, the first fluid inlet and outlet port 112 is vertically penetrated and formed; and the first fluid through-hole 114 is horizontally penetrated and formed.

The lower nozzle plate 120 has a circle-shaped plate body form and the structure with a concave fluid path 121 and a hole type second fluid inlet and outlet port 123 formed is provided on the position of the outer circumferential portion of the upper surface thereof.

More specifically, the outer circumferential portion of the upper surface of the lower nozzle plate 120 is concavely formed with the fluid path 121 in which the fluid flows along the circumference thereof; a predetermined position of the fluid path 121 is vertically penetrated and formed with the second fluid inlet and outlet port 123; and the position adjacent to the second fluid inlet and outlet port 123 is formed with a partition wall 122 for guiding the fluid, which flows along the fluid path 121, toward the second fluid inlet and outlet port 123.

Further, an inner circumference portion of the upper surface of the lower nozzle plate 120 is repeatedly formed with a second fluid through-hole 125 vertically penetrated with an upper nozzle plate supporting surface 124 along the circumference thereof.

The membrane 130 forms a gap between the upper nozzle plate 110 and the lower nozzle plate 120, that is, an orifice-shaped gap through which the fluid may pass, and is movably interposed between the upper nozzle plate 110 and the lower nozzle plate 120.

Particularly, the membrane 130 is provided as a cylinder shape, and a pattern of crests and valleys is formed along the circumference thereof. The pattern of crests and valleys may selectively contact the upper nozzle plate 110 and the lower nozzle plate 120.

Referring again to FIG. 6, as described above, the orifice portion 100 with the membrane 130 interposed between the upper nozzle plate 110 and the lower nozzle plate 120 is mounted between the lower portion of the main rubber 14 and the upper portion of the lower rubber film 28.

The membrane 130 is interposed between the upper nozzle plate 110 and the lower nozzle plate 120, as illustrated in the FIGS. 7 and 8. The membrane 130 is positioned to contact an outer diameter portion of the vertical pipe 113 of the upper nozzle plate 110 and an inner diameter portion of the lower nozzle plate 120.

More specifically, a crest 131 of the membrane 130 is spaced apart from the outer diameter portion of the vertical pipe 113 of the upper nozzle plate 110 and arranged as the outwardly convex status and simultaneously, arranged as the status possibly contacting with the inner diameter portion of the lower nozzle plate 120; and a valley 132 of the membrane is spaced apart from the inner diameter portion of the lower nozzle plate 120 and arranged as the inwardly convex status and simultaneously, arranged as the status possibly contacting with the outer diameter portion of the vertical pipe 113 of the upper nozzle plate 110.

Meanwhile, for securing the fluidity of the membrane 130, the membrane 130 is provided as the size smaller than the space interposed between the upper nozzle plate 110 and the lower nozzle plate 120.

For this purpose, as illustrated in FIG. 9, by forming the width (d1) between the vertical pipe 113 of the upper nozzle plate 110 and the inner diameter portion of the lower nozzle plate 120 to be larger than the thickness (d2) of the membrane 130; and the height (D1) between the horizontal plate 111 of the upper nozzle plate 110 and a bottom plate of the lower nozzle plate 120 to be larger than the height (D2) of the membrane 130, the membrane 130 may become the status which is movably positioned in the space interposed between the upper nozzle plate 110 and the lower nozzle plate 120 and the membrane 130 may maintain the original shape at the time prior to the compression or the tension by the fluid pressure.

Accordingly, when a large displacement vibration (e.g., due to driving the vehicle on a rough road) is input to the hydraulic mount having the configuration, while the fluid within the upper fluid chamber 22, as illustrated in FIG. 10, enters into the fluid path 121 of the lower nozzle plate 120 through the first fluid inlet and outlet port 112 formed on the horizontal plate 111 of the upper nozzle plate 110, and then passes through the second fluid inlet and outlet port 123 formed on a predetermined position of the fluid path 121 to be filled into the lower fluid chamber 24, the high reduction absorbing the large displacement vibration is implemented.

In this case, since upon the input of the large displacement vibration, the fluid within the upper fluid chamber 22 directly does not operate on the membrane 130 while vertically excited, passes through the first fluid through-hole 114 of the vertical pipe 113 which exists in the radial direction perpendicular to the excited direction, and then operates on the membrane 130, it is possible to delay hitting the inner diameter surface of the lower nozzle plate 120 while the membrane 130 moves, thereby reducing the rattle noise occurring in the case that the membrane hits the nozzle plate.

Further, the movement that the membrane 130 is compressed by the fluid pressure toward the lower fluid chamber 24 from the upper fluid chamber 22, or the membrane 130 is tensioned by the fluid pressure toward the upper fluid chamber 22 from the lower fluid chamber 24 and the like occurs; and as illustrated in the accompanying FIG. 12, the portions of the crest 131 and the valley 132 of the membrane 130 sequentially contact with the upper nozzle plate or the lower nozzle plate, thereby distributing the collision occurring in the case that the membrane 130 contacts with the upper nozzle plate or the lower nozzle plate to further reduce the rattle noise.

On the other hand, when a small displacement vibration (e.g., due to an idle vibration or driving a vehicle on a smooth road) is input to the hydraulic mount, as illustrated in FIG. 11, it is possible to absorb the small displacement vibration while the fluid within the upper fluid chamber 22 passes through the gap between the upper nozzle plate 110 and the membrane 130 and the gap between the membrane 130 and the lower nozzle plate 120 and then moves to the lower fluid chamber 24 through the second fluid through-hole 125 of the lower nozzle plate 120, thereby improving Noise, Vibration & Harshness (NVH) characteristics.

The disclosure has been described in detail with reference to certain embodiments thereof. However, it will be appreciated by those skilled in the art that changes may be made in these embodiments without departing from the principles and spirit of the disclosure, the scope of which is defined in the appended claims and their equivalents.

What is claimed is:

1. A hydraulic mount for a vehicle comprising:
a core bush coupled to a bolt;
a main rubber formed on an outer surface of the core bush;
an orifice portion coupled to a lower portion of the main rubber to divide an upper fluid chamber and a lower fluid chamber; and
a lower rubber film coupled to a lower portion of the orifice portion, wherein
the orifice portion includes an upper nozzle plate formed with a first fluid inlet and outlet port, a lower nozzle plate formed with a fluid path and a second fluid inlet and outlet port, and a cylinder shaped membrane vertically arranged between the upper nozzle plate and the lower nozzle plate, and
a pattern of crests and valleys is formed along a circumference of the membrane, the pattern of crests and valleys selectively contacting the upper nozzle plate and the lower nozzle plate,
wherein the upper nozzle plate includes a ring-shaped horizontal plate, and the first fluid inlet and outlet port and a vertical pipe are formed on an inner diameter portion of the horizontal plate and supported by the lower nozzle plate.

2. The hydraulic mount for the vehicle of claim 1, wherein the vertical pipe is formed with a plurality of first fluid through-holes at a uniform interval along a circumference thereof.

3. The hydraulic mount for the vehicle of claim 1, wherein:
the fluid path is formed on an outer circumference of an upper surface of the lower nozzle plate,
the second fluid inlet and outlet port is formed on a predetermined position of the fluid path, and
second fluid through-holes are repeatedly formed along an inner circumference of the upper surface of the lower nozzle plate, the second fluid through-holes vertically penetrated with an upper nozzle plate supporting surface.

4. The hydraulic mount for the vehicle of claim 1, wherein a distance between the vertical pipe and an inner diameter portion of the lower nozzle plate is formed to be larger than a thickness of the membrane.

5. The hydraulic mount for the vehicle of claim 1, wherein a distance between the horizontal plate and a bottom plate of the lower nozzle plate is formed to be larger than a height of the membrane.

* * * * *